United States Patent [19]

Staples

[11] Patent Number: 4,597,073
[45] Date of Patent: Jun. 24, 1986

[54] FULL-DUPLEX SPLIT-SPEED DATA COMMUNICATION UNIT FOR REMOTE DTE

[75] Inventor: Leven E. Staples, San Antonio, Tex.

[73] Assignee: Data Race, Inc., San Antonio, Tex.

[21] Appl. No.: 770,146

[22] Filed: Aug. 27, 1985

[51] Int. Cl.[4] .............................................. H04L 5/14
[52] U.S. Cl. ...................................... 370/24; 370/30; 375/7
[58] Field of Search ................ 370/24, 30, 84; 375/7, 375/8, 9; 371/2; 364/200, 900

[56] References Cited

U.S. PATENT DOCUMENTS

| | | | |
|---|---|---|---|
| 3,674,922 | 7/1972 | Salaman et al. | 375/8 |
| 3,852,534 | 12/1974 | Tilk | 375/8 |
| 3,937,882 | 2/1976 | Bingham | 375/8 |
| 4,044,307 | 8/1977 | Borysiewicz et al. | 375/8 |
| 4,085,449 | 4/1978 | Walsh et al. | 375/8 |
| 4,101,833 | 7/1978 | Bingham et al. | 375/8 |
| 4,200,936 | 4/1980 | Borzcik et al. | 375/8 |
| 4,320,520 | 3/1982 | Graham | 375/8 |
| 4,384,356 | 5/1983 | Beerbaum | 375/8 |
| 4,388,697 | 6/1983 | Breen et al. | 375/8 |
| 4,398,299 | 8/1983 | Darling et al. | 375/8 |
| 4,425,664 | 1/1984 | Sherman et al. | 375/8 |

Primary Examiner—Douglas W. Olms
Assistant Examiner—Kenneth I. Rokoff
Attorney, Agent, or Firm—McCamish, Ingram, Martin & Brown

[57] ABSTRACT

The disclosed data communication equipment (DCE) provides full-duplex, split-speed data communication over 2-wire dial-up telephone circuits, typically between a host processor and data terminal equipment (DTE). A telephone line interface includes low speed and high speed modems that establish a low-speed DTE-to-Host communication channel and a high-speed Host-to-DTE communication channel for split-speed full-duplex data communication. An I/O interface interfaces the DCE to the Host/DTE I/O ports at selectable asynchronous I/O speeds (typically symmetrical). A communications processor provides buffering and control functions, and implements split-speed data communication in accordance with the high-speed and low-speed communication protocols. In addition, the communication processor provides data compression for the high-speed channel, and error checking and retransmission for both the high speed and low speed channels. The DCE telephone line interface network is switchable between Host and DTE modes.

14 Claims, 2 Drawing Figures

DDD NETWORK

FULL-DUPLEX SPLIT-SPEED DATA COMMUNICATION UNIT FOR REMOTE DTE

BACKGROUND OF THE INVENTION

1. Technical Field

The present invention pertains to full-duplex data communication devices for dial-up 2-wire telephone circuits, and more particularly to such devices for on-line, interactive operation of remote data terminal equipment from a host processor.

2. Background

Selecting dial-up 2-wire telephone circuits versus dedicated or conditioned lines for interactively operating remote data terminal equipment (DTE), such as video display terminals and printers, typically has involved a susbstantial trade-off between cost and performance.

Data communication equipment (DCE) optimized for remote-to-host on-line operation typically use synchronous data communication over dedicated and/or conditioned telephone facilities. That approach necessarily reduces the utility of remote DTE because economics often dictates using less expensive asynchronous DTE and the least expensive, and therefore lowest quality, telephone communication facilities—dial-up 2-wire switched telephone circuits (the DDD network). Compared with more costly data communication links, such circuits have a limited passband (approximately 2800 Hz), and are prone to communication errors due to noise or other disturbances on the telephone circuit.

For example, asynchronous DTE typically operate at symmetrical transmit/receive speeds of 9600 bps. Typical asynchronous DCE used for communication over the DDD network, however, communicate at 1200 bps, which limits the utility of remote asynchronous DTE due to inadequate response time.

Some improvement in effective Host/DTE communication rate can be achieved using different modulation schemes. For full-duplex operation, asynchronous modems typically allocate one-half of the telephone circuit passband to each direction. One technique for improving communication throughput uses split-speed modems that asymmetrically allocate bandwidth to provide a high speed channel (e.g., 2000 Hz bandwidth) and a low speed channel (e.g., 300 Hz bandwidth). Split-speed operation takes account of the fact that remote DTE such as a video display terminal typically can receive data from the Host (i.e., for screen display) at a much higher rate than it will transmit (i.e., as a result of keyboard entry). Split-speed DCE, however, typically operates synchronously and requires a synchronous, split-speed DTE I/O interface, precluding its use with standard asynchronous DTE having symmetrical I/O rates.

SUMMARY AND OBJECTS OF THE INVENTION

Objects

The principal object of the present invention is to provide DCE optimized for on-line, interactive data communication for remote asynchronous DTE over the DDD network, including providing:

1. Asynchronous interface to DTE with symmetrical I/O rates.
2. Split-speed operation using a high speed Host-to-DTE channel and a low speed DTE-to-Host channel (frequency multiplexed for full-duplex operation).
3. Error protection (checking and retransmission) to facilitate reliable, high speed communication over the high speed channel.

SUMMARY

These and other objects are provided by the data communication equipment of the present invention which includes:

(a) an asynchronous I/O interface network;
(b) a telephone line interface network; and
(c) a communication processor for controlling all data communication functions (including buffering and error protection).

The I/O interface provides separate transmit and receive paths operating at the equipment I/O rates (typically symmetrical). The telephone line interface includes channel separation circuitry, as well as high speed and low speed modems that provide corresponding high speed and low speed communication channels multiplexed for full-duplex operation. The telephone line interface is configurable such that the high speed channel provides the transmit path for operation with Host equipment, and the receive path for operation with DTE.

The communication processor includes a CPU and associated memory buffer, and executes a stored communication program to provide data communication and error protection (including error checking and retransmission) functions.

For data transmission, the communication processor buffers Host/DTE characters in the memory buffer, provides corresponding control and error checking codes, and outputs characters for transmission over the high speed (Host-to-DTE) or low speed (DTE-to-Host) channel according to the appropriate protocol. For data reception, the communication processor buffers received Host/DTE data, checks and validates the received data for errors (signalling for retransmission if necessary), and outputs Host/DTE characters from the memory buffer through the asynchronous I/O interface to the Host/DTE. For a preferred embodiment, the communication processor also provides data compression for the high speed channel.

BRIEF DESCRIPTION OF THE DRAWINGS

The following detailed description of a preferred embodiment should be considered in conjunction with the accompanying drawings in which.

DESCRIPTION OF THE PREFERRED EMBODIMENT

The preferred embodiment of the present invention will be described in relation to the Remote Asynchronous Computer Extension ("RACE") unit developed and manufactured by Data Race Inc., the assignee of the present invention. RACE unit communication achieves effective Host/DTE data transfer rates significantly greater than presently available DCE, with typical Host-to-DTE speeds in the range of 4800 to 9600 bps.

RACE data communication equipment (DCE) provides a high speed communication link over 2-wire, dial-up telephone circuits (the DDD network) between a Host unit (such as a processor or controller) and remote data terminal equipment (DTE) (such as a video display terminal or printer). RACE units interface to the asynchronous I/O ports of the Host and DTE, providing:

(a) full-duplex, split-speed operation using high speed host-to-remote and low speed remote-to-host data channels frequency multiplexed into the passband of the DDD circuit;

(b) data compression on the high speed channel;

(c) error protection (error checking and retransmission);

(d) data buffering and flow control as necessary to asynchronously interface the high speed and low speed data channels to the Host/DTE I/O ports; and (e) inter-RACE unit control signalling including host-pause and retransmit.

Figure 1:
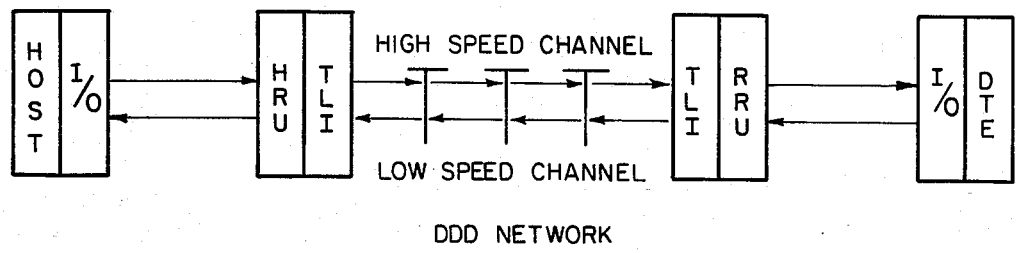
FIG. 1 is a system overview schematic.

Referring to FIG. 1, a RACE unit (RU) is configurable for DCE operation at either end of the communication link, providing an interface to the DDD network for either a Host processor/controller or remote DTE. For Host operation, the Host RU (HRU) is configured to provide a high speed Host-to-DTE transmit channel and a low speed DTE-to-Host receive channel. For remote DTE operation, the remote RU (RRU) is configured to receive Host data on the high speed channel and to transmit DTE data on the low speed channel.

Telephone Line Interface

Figure 2:
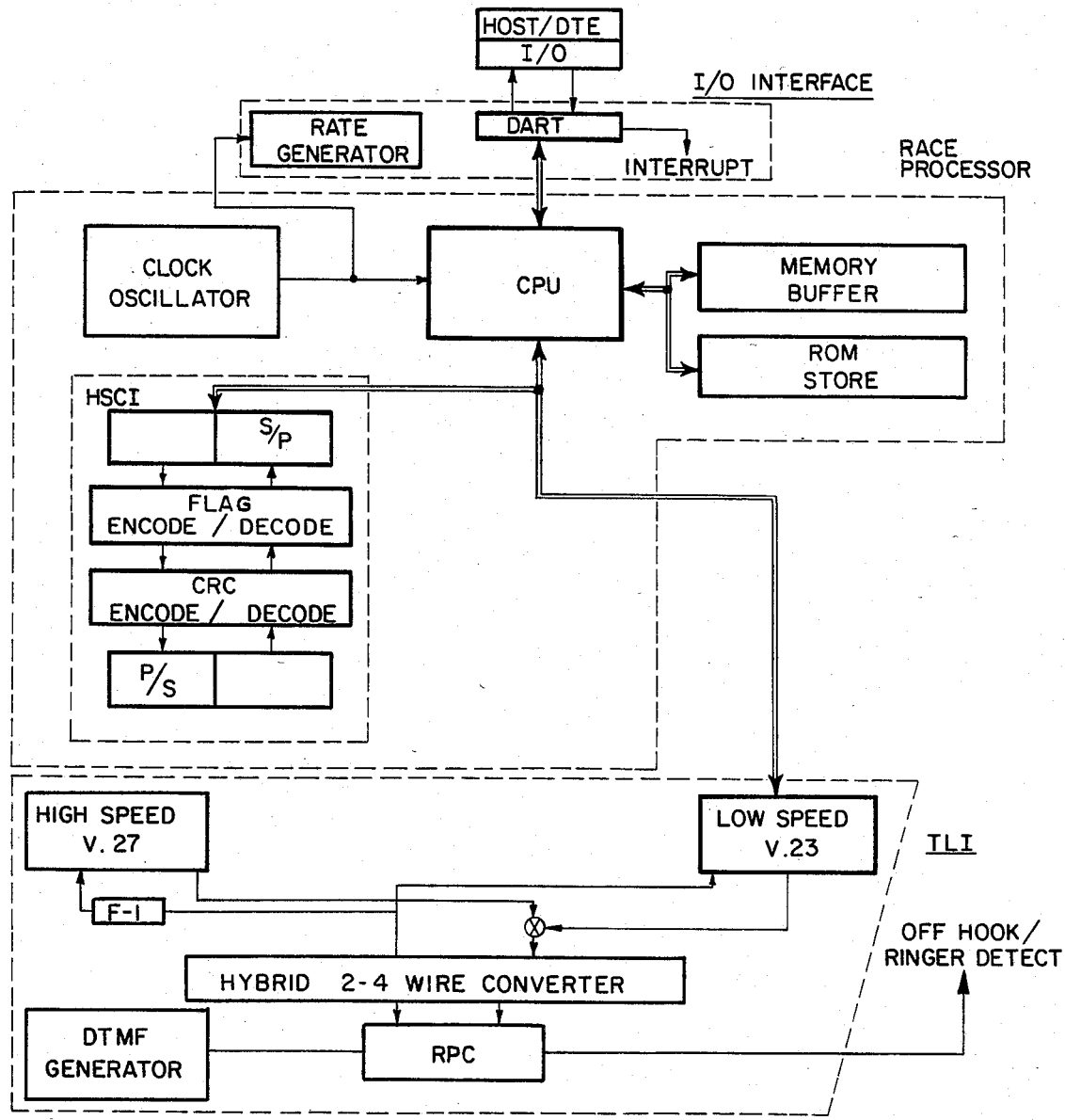
FIG. 2 is a schematic diagram of a RACE unit.

Referring to FIG. 2, an RU couples the Host/DTE to the DDD network through a TLI (telephone line interface) network comprising:

(a) an FCC Part 68 registered protective circuit (RPC);

(b) a hybrid 2-4 wire converter;

(c) an HRU/RRU select switch; and (d) two modems—a high speed modem for the Host-to-DTE channel and a low speed modem for the DTE-to-Host channel.

The RPC is a standard telephone line interface that provides isolation from the DDD network as required by FCC Part 68. The RPC provides ringer detection and off-hook signalling, and is coupled to a standard DTMF signalling circuit. The hybrid 2-4 wire converter provides a standard interface between the modem's 4-wire transmit/receive paths and 2-wire DDD circuits. A filter circuit F1, such as a Reticon model 5611, is included in the high speed receive channel to provide additional separation/filtering. The specific design of these circuits is not important to the present invention.

The preferred high speed modem is a Rockwell R96FAX CCITT V.27 PSK modem that operates synchronously, using 8-phase keying (encoding 3 data bits per baud). The low speed modem is an AMD 7911 CCITT V.23 FSK modem that operates asynchronously. These modems provide frequency multiplexed high speed and low speed channels over standard DDD circuits compatible with the CCITT V.27 and V.23 protocols. The high speed V.27 channel for Host-to-DTE communication uses the 850-2800 Hz portion of the DDD bandwidth, while the low speed V.23 channel for DTE-to-Host communication uses the 300-600 Hz sub-band. The specific design of the high speed/low speed modems is not important to the present invention.

The HRU/RRU switch is an electromechanical relay that switches the transmit path of the hybrid 2-4 wire converter as required for either HRU or RRU operation. For the HRU configuration, the switch couples the transmit (modulator) output of the high speed modem (high speed channel) to the transmit path of the hybrid converter. For the RRU configuration, the HRU/RRU switch is placed in the opposite state to provide low speed transmit channels. For the receive path in both configurations, the incoming high speed data (RRU) or low speed data (HRU) is applied to both modems, and ignored by the modem that is in the transmit mode.

I/O Port Interface

The RU interfaces to the Host/DTE I/O ports through an asynchronous I/O Interface network providing selectable asynchronous bit rates for the transmit/receive paths. For example, the I/O Interface is configurable to provide symmetrical 9600 bps receive/transmit paths in accordance with common DTE I/O operation (with other common I/O speeds being 1200, 2400 and 4800 bps and 19.2 Kbps).

The I/O Interface comprises:

(a) an I/O receiver/transmitter (DART) network that provides serial/parallel and parallel/serial conversion for the I/O transmit/receive paths; and (b) a switchable Rate Generator for selectively clocking the receiver/transmitter network in accordance with Host/DTE I/O operation.

The Interface operates with a standard 10 or 11-bit asynchronous character format—7 data bits plus parity, one start bit and one or two stop bits.

In accordance with the selected clock rate for each path (e.g. 9600 bps transmit and receive), the Rate Generator clocks the receiver/transmitter network to, respectively, (i) accept Host/DTE characters serially from the I/O transmit path for conversion to parallel, and (ii) transfer characters serially to the Host/DTE via the I/O receive path. The receiver/transmitter network provides appropriate control signals to indicate I/O-ready conditions.

For a preferred embodiment, the receiver/transmitter network is a Z80A DART (dual asynchronous receiver/transmitter), and the Rate Generator is a CD4040. The Rate Generator clock is derived from a 2.4576 MHz oscillator. For the I/O transmit path, the DART receives asynchronous characters from the Host/DTE I/O ports, assembles character bytes (7 data bits plus parity or 8 data bits) and provides character-ready interrupts. For the I/O receive path, the DART receives character bytes, adds start/stop bits and asynchronously transmits the bytes serially to the Host/DTE at the selected I/O rate. The DART includes a one-character buffer for both the receive and transmit paths.

The specific design of these circuits is not important to the present invention.

RACE Processor

A RACE processor couples data between the I/O Interface and TLI networks, implementing RACE data communication. The RACE processor comprises:

(a) a microprocessor CPU;

(b) an associated main memory subsystem, designated Memory Buffer in FIG. 2;

(c) a RACE program ROM store;

(d) a high speed channel interface HSCI including parallel/serial-serial/parallel conversion; and (e) a clock oscillator.

Through execution of the RACE program, the RACE processor provides:
 (a) data communication including buffering and flow control;
 (b) error protection including error checking code (ECC) generation and checking, and retransmission if necessary;
 (c) data compression (character and string) for the high speed channel; and
 (d) all control functions necessary for RACE operation.

The preferred RACE processor is a Z80 microprocessor with 8K bytes of static RAM Memory Buffer and 16K bytes of EPROM for RACE program store. The RAM is memory-mapped by the RACE program to provide the necessary buffers and working registers.

The preferred HSCI comprises a Z80SIO9 modem interface network. The HSCI provides the parallel/serial-serial/parallel conversion function necessary to interface the CPU to the high speed modem. In addition, the HSCI implements the following CCITT V.27 protocol functions (which could be implemented in the RACE program, but are off-loaded to hardware to conserve CPU time):
 (a) zero insertion (transmit path) and deletion (receive path);
 (b) flag encode/decode; and
 (c) CRC ECC encoding/insertion and decoding/checking.

The HSCI network includes a two character buffer in the transmit path and a four character buffer in the receive path.

For HRU operation, the HSCI provides appropriate interrupts to the RACE processor to retrieve characters for transmission over the high speed channel. For RRU operation, the HSCI provides appropriate interrupts to signal the receipt of data (including control field data) and CRC ECC checking.

The specific design and coding of the RACE program is not important to the present invention. The program, and corresponding RACE processor operation, is described functionally in the context of RACE data communication.

High Speed Communication

High speed Host-to-DTE communication over the DDD network uses the CCITT V.27 protocol. For the preferred embodiment, RACE high speed V.27 communication is in accordance with the CCITT HDLC protocol, which specifies data transmission HDLC blocks or frames comprising (i) a start flag, (ii) a one-byte control field, (iii) a string of character data bytes up to a maximum HDLC data block length (e.g. 256 characters), (iv) a CCITT CRC 16-bit error checking code (ECC), and (v) a termination flag. The control byte is used to transmit control information between RACE units including a two-bit NR (next-to-receive) value identifying the block being sent and retransmit requests.

Host characters are assembled by the DART in the Host I/O Interface network; for each character the DART provides a CPU interrupt to indicate Host character-ready. In response, the CPU retrieves the host character, converts the 7 data bits to a compressed format and places the data compressed value in a high speed channel buffer.

An HDLC block transmission cycle is commenced when a high speed-transmit task running in the CPU recognizes a difference in the DART and HSCI buffer pointers to the high speed channel buffer indicating that a character is ready for transmission. That task then assembles the appropriate control byte (compressed format) and presents it to the HSCI. The HSCI responds by generating the HDLC start flag and commencing serial transmission (with zero insertion) via the high speed modem. Once transmission starts, the HSCI provides time-critical character-request interrupts to the CPU.

The CPU responds to successive character-request interrupts from the HSCI by transferring character data (compressed format) from the high speed channel buffer to the HSCI, at the same time routing Host characters into the buffer in response to DART character-ready interrupts. The HSCI serially transmits these characters until an end-of-block condition occurs when either (i) a character-request interrupt is not timely answered by the CPU, or (ii) a maximum HDLC data block length is reached.

When the HSCI detects end-of-block, the CRC ECC is calculated and serially transmitted at the trailing end of the HDLC block along with the termination flag. The HSCI is then ready to commence another HDLC block transmission cycle upon receipt of a control byte from the CPU.

The HRU RACE processor transmits HDLC blocks according to a modulo four scheme. That is, the RACE processor transmits up to four HDLC blocks before receiving an acknowledgement from the RRU requesting transmission of the next block or retransmission of a previous block(s). If such acknowledgement is not received by the end of a time-out period after transmission of the fourth block, the HRU RACE processor generates and transmits up to a predetermined number of requests for acknowledgement before dropping the link.

In the RRU, the HDLC block is received via the TLI network and demodulated by the high speed modem (after 2–4 wire conversion and filtering). The demodulated HDLC block is applied serially to the HSCI network in the RACE processor.

Upon receipt of each new HDLC block as indicated by the HDLC start flag, the HSCI network decodes the control bits and performs zero deletion. For the HDLC data block, the HSCI network performs serial/parallel conversion and byte segregation, and provides an HDLC character-ready interrupt to the CPU each time a character (compressed format) is ready.

In response to successive HDLC character-ready interrupts, the CPU transfers the character bytes (compressed format) to a high speed channel buffer, assembling an HDLC data block. When the end of an HDLC block is received in the HSCI network, the CRC ECC is decoded and checked and a CRC-check interrupt is provided to the CPU.

Depending on the CRC check result, the RRU RACE processor transmits back to the HRU over the low speed channel an acknowledgement such that:
 (i) if CRC checks valid, the HRU RACE processor transmits the next HDLC block, or
 (ii) if CRC checks invalid, the HRU RACE processor retransmits the erroneous block(s).

Invalid HDLC data blocks are discarded by the CPU.

For valid blocks, a transmit-to-DTE task retrieves character data bytes out of the high speed channel buffer, performs decompression, calculates parity and presents the characters to the DART in the DTE I/O Interface network. The DART adds a start bit and one or two stop bits, and the character is transmitted serially to the DTE via the receive I/O path.

For a preferred embodiment, the RRU RACE processor must acknowledge receipt of transmitted HDLC blocks, specifying either the next block to be transmitted or the block(s) to be retransmitted. Such acknowledgement is returned to the HRU via the low speed channel using the two-bit control field of either (i) a packet RR (receive ready) byte, or (ii) an async-byte used to transmit DTE characters.

The packet RR byte is a short asynchronous-byte comprising (i) a start bit, (ii) a 4-bit control field, (iii) a 2-bit NR (next-to-receive) code specifying the next HDLC block to be transmitted by the HRU RACE processor, (iv) a 2-bit ECC field, and (v) a stop bit. The packet RR byte is generated by the the RRU RACE processor and injected into the low speed, asynchronous data channel if no DTE data character is ready for the transmission over the low speed channel to the HRU and an HDLC block quadruplet has been received.

For normal modulo four operation, up to four HDLC blocks may be transmitted by the HRU prior to receiving a return acknowledgement from the RRU. Specifically, the RRU RACE processor injects the appropriate control value into either (i) the next async-byte containing DTE data to be transmitted, or if an HDLC block quadruplet is received without an async-byte being ready for transmission, (ii) a packet RR byte generated by the RACE processor. The acknowledge/control field designates for transmission either (i) the first invalid HDLC block received after the previous acknowledgement, or if no errors occurred in transmission, (ii) the next-in-line (NR) HDLC block.

If the RRU RACE processor does not return either an async-byte or a packet RR containing the appropriate NR acknowledgement after four HDLC blocks have been transmitted, the HRU RACE processor generates and injects into the high speed channel successive request-for-acknowledgement blocks. If an acknowledgement is not received after a preselected number of such requests, the HRU RACE processor drops the link.

Alternatively, to avoid having to inject control bits into an async-byte, thereby increasing communication speed, the receipt of a shortened async-byte from the RRU can be deemed an acknowledgement. This scheme assumes that the DTE data generated by keyboard entry is being monitored by the DTE operator, who will recognize key-in errors displayed on the video display terminal, whether the errors result from key entry or data transmission errors.

In summary, the RACE program tasks executed by the HRU RACE processor to provide Host-to-DTE communication over the high speed channel are:
(a) Receive-from-Host task
(i) Respond to character-ready interrupt from DART and retrieve character data (7 or 8 data bits)
(ii) Compress character data and route successively received characters (compressed format) to the high speed channel buffer
(b) HS(high speed)-transmit task
(i) Respond to transfer of character to high speed channel buffer by generating corresponding control byte and presenting it to HSCI to commence an HDLC block transmission cycle
(ii) Respond to character-request interrupts from the HSCI by transferring characters from the high speed channel buffer to the HSCI for HDLC block transmission over the high speed channel to the RRU
(iii) As appropriate, generate and inject into the high speed channel via the HSCI request-for-acknowledgement HDLC blocks.

At the receive end of the high speed channel, the RACE processor executes the following RACE program tasks:
(c) HS(high speed)-receive task
(i) Respond to HDLC character-ready interrupts from HSCI network by transferring characters, to the high speed channel buffer, assembling an HDLC data block
(ii) If CRC-valid indication is received from the HSCI, post the transmit-to-DTE task and acknowledge receipt
(iii) If CRC-invalid indication is received, discard HDLC data block and request retransmission
(iv) If an async-byte is ready for transmission over the low speed channel, inject appropriate acknowledgement/retransmission-request into control field
(v) If an async-byte is not ready for transmission and one-to-four HDLC blocks have been received without acknowledgement, generate a packet RR byte and transmit over the low speed channel
(d) Transmit-to-DTE task
(i) Retrieve character data from high speed channel buffer, perform decompression and insert parity bit
(ii) Transmit to DTE via DART in I/O Interface network.

Low Speed Communication

Low speed DTE-to-Host communication over the DDD network is in accordance with the CCITT V.23 protocol, using 13(or 14)-bit async-bytes comprising (i) a start bit, (ii) a 2-bit control field, (iii) a 7 or 8-bit data field, (iv) a 2-bit error checking code (ECC), and (v) a stop bit.

DTE characters (7 data bits plus parity or 8 data bits) are assembled in the DART (DTE I/O Interface network), which provides corresponding DTE character-ready interrupts to the CPU. The CPU retrieves DTE characters and places the data bits in a low speed channel buffer.

Through execution of a low speed transmit task, the CPU (i) retrieves the next-in-line character byte from the low speed channel buffer, (ii) inserts the corresponding control and calculated ECC bits, and (iii) routes the async-byte to an intermediate buffer. Completed async-bytes are transferred serially by the CPU to the low speed modem for transmission over the low speed V.23 channel to the HRU.

The control field is used to acknowledge receipt of valid HDLC blocks over the high speed channel or request retransmission of invalid blocks. Alternatively, the low speed transmit task may generate a packet RR byte to provide an acknowledgement/retransmission-request.

In the HRU, the async-bytes from the low speed channel are received via the TLI network. The CPU retreives demodulated async-bytes serially from the low speed modem and assembles a completed async-byte in an intermediate buffer. For each completed async-byte, the CPU decodes the control bits and checks ECC, storing the character data in a low speed channel buffer.

If ECC checks valid, no acknowledgement is sent to the HRU. If ECC checks invalid, the HRU RACE processor requests retransmission using the control byte of the next HDLC block transmitted over the high speed channel. The HDLC control byte includes a bit that if set causes the RRU RACE processor to retransmit the last async-byte transmitted to the HRU. If no HDLC block is ready for transmission, the CPU generates a packet RR HDLC block containing the retransmission-request control code.

Through execution of a transmit-to-Host task, the CPU (i) retrieves DTE characters from the low speed channel buffer, (ii) calculates parity, and (iii) transfers characters to the DART in the Host I/O Interface network. Start and stop bits are inserted, and the DTE character is clocked serially out of the DART to the Host via the receive I/O path.

In summary, the RACE program tasks executed by the RRU RACE processor to provide low speed DTE-to-Host communication are as follows:

(a) Receive-from-DTE task
 (i) Respond to character-ready interrupt from DART and route character data (7 or 8 data bits) to the low speed channel buffer
 (ii) Post the LS-transmit task
(b) LS(low speed)-transmit task
 (i) Retrieve character from the low speed channel buffer, calculate ECC, generate two-bit control code and assemble a completed async-byte (7 or 8 data bits, plus ECC and start/stop) in the intermediate buffer
 (ii) As appropriate, when no character async-byte is ready for transmission, generate a packet RR byte and place in intermediate buffer
 (iii) Transmit the async-byte or packet RR byte serially via low speed modem.

Upon receipt of an async-byte or packet RR byte, the HRU RACE processor executes the following RACE program tasks:

(c) LS(low speed)-receive task
 (i) Receive async-bytes serially from low speed modem and place the low speed channel buffer
 (ii) Decode control bits and check ECC
 (iii) If ECC checks invalid, generate retransmission-request control byte for transmission with either the next HDLC block or a packet RR HDLC block
 (iv) If ECC checks valid, post the transmit-to-Host task
(d) Transmit-to-Host task
 (i) Retrieve character data from the low speed channel buffer and calculate parity (for 7 bit data)
 (ii) Transmit character to Host via DART in Host I/O Interface Flow Control The preferred RACE unit provides two forms of flow control: (i) the ASCII X-on/X-off, and (ii) EIA lead control. The receive-from-DTE task running in the RRU RACE processor decodes X-on/X-off from the DTE and EIA lead signals to implement the specified flow control functions.

Host-Pause

Under certain conditions, the RRU RACE processor must pause Host high speed data communication. Typically, this host-pause condition occurs in response to an X-off flow control character received from the DTE (e.g. a printer pause condition). However, the host-pause condition can also occur if DDD line quality deteriorates significantly such that continuous HRU retransmissions are required.

In response to X-off, the RRU RACE processor ceases transferring Host characters from the high speed channel buffer to the DTE I/O interface. As HDLC blocks continue to be received over the high speed channel, the high speed channel buffer eventually overflows. This buffer-full condition causes an interrupt that calls a host-pause task.

Through execution of the host-pause task, the RRU RACE processor generates and transmits via the low speed DTE-to-Host channel a host-pause asynchronous-byte. The HRU RACE processor receives and decodes the host-pause async-byte, and ceases transmitting HDLC blocks over the high speed channel.

After receipt of the host-pause asynchronous-byte, the HRU RACE processor continues to retrieve Host characters from the Host I/O Interface, and route them to the high speed channel buffer until overflow. In response to this buffer-full condition, the CPU provides X-off to the Host via the Host's I/O interface.

When the DTE outputs X-on, the RRU RACE processor commences transferring Host characters from the high speed channel buffer to the DTE I/O interface. In addition, the RRU RACE processor transmits via the low speed channel a packet RR async-byte indicating the next HDLC block to be transmitted by the HRU. Receipt of this packet RR async-byte causes the HRU CPU to commence transmitting HDLC blocks, and to provide X-on to the Host.

Data Compression

For a preferred embodiment, to optimize data communication speed, the RACE units employ two types of data compression for Host HDLC data transmitted via the high speed channel—character and string. Data compression is implemented through execution of corresponding data compression tasks in the HRU and RRU RACE processors. The specific data compression implementation is not important to the present invention.

Character compression is achieved in accordance with the CCITT HDLC protocol, which assembles HDLC blocks using only the 7 or 8 data bits of a 10- or 11-bit asynchronous character. Thus, extraneous asynchronous bits (start, stop, and parity) are not transmitted as part of an HDLC data block.

The preferred string compression algorithm embodied in the HRU data compression task replaces every string of three or more of the same character with a 3-byte code designating the character to be repeated, a control code, and a repeat number code.

In addition to character and string compression, the preferred embodiment provides another form of quasi-compression for transmissions from the HRU over the high speed channel—repeat character. Some video display terminls use a repeated 2 or 3 character sequence to designate cursor position. In such a case, the RRU CPU transmits the initial cursor positioning character but replaces the associated 1 or 2 repeat cursor position characters with a short (less than 7 bits) repeat-2 or repeat-3 character. Also, in a character hold-down condition (such as when underlining) the RRU CPU transmits the first character and then a series of short repeat characters until the held-down key is released. The HRU CPU recognizes the repeat characters, and provides appropriate characters to the Host, which returns the same character sequence to the RRU for corresponding display.

I claim:

1. Data communication equipment, DCE, for full-duplex data communication between Host equipment and remote data terminal equipment, DTE, over a telecommunications circuit comprising:
   (a) TLI, telephone line interface, network means for coupling the DCE to the circuit to provide full-duplex, split-speed communication, including:
      (i) low-speed communication means for communicating at a low-speed rate in accordance with a low-speed protocol, thereby establishing a DTE-to-Host low-speed communication channel; and
      (ii) high-speed communication means for communicating at a high-speed rate in accordance with a high-speed protocol, thereby establishing a Host-to-DTE high-speed communication channel;
   (b) I/O Interface network means for interfacing the DCE to Host/DTE I/Q ports in accordance with an I/O protocol; and
   (c) communications processor means, including a memory buffer, for
      (i) buffering data in said memory buffer;
      (ii) transferring data between said TLI and I/O Interface means via said memory buffer; and
      (iii) at least for data communication over the high-speed channel, performing an error checking function including inserting an error-checking-code at the transmitting DCE, i.e., at the Host for the high-speed channel, and checking such code and requesting retransmission of invalid data at the receiving DCE, i.e., at the DTE for the high-speed channel;
   thereby implementing full duplex, split-speed data communication in accordance with high-speed and low-speed protocols for high speed Host-to-DTE, error protected, and low-speed DTE-to-Host communication.

2. The DCE defined in claim 1 wherein, for data communication over the low-speed channel, said communications processor means performs error checking including inserting an error-checking-code at the transmitting DCE, i.e., at the DTE, and checking such code and requesting retransmission of invalid data at the receiving DCE, i.e., at the Host.

3. The DCE defined in claim 2 wherein, for data communication over the high-speed channel, said Host DCE communications processor means compresses data according to a compression scheme and said DTE DCE communications processor means performs decompression.

4. The DCE defined in claim 1 wherein, for data communication over the high-speed channel:
   (a) the functions performed by the Host DCE communications processor means comprise
      (i) executing a receive-from-Host task to retrieve and buffer data from the Host; and
      (ii) executing a HS-transmit task to assemble Host data according to the high-speed protocol, including error-checking-code insertion, and to transmit the data via said TLI means over the high-speed communications channel; and
   (b) the functions performed by the DTE DCE communications processor means comprise
      (i) executing a HS-receive task to buffer Host data received over the high-speed channel via said TLI means, to check the received data for errors, and for invalid data, to request, via the low-speed communications channel, retransmission of the invalid data by the Host DCE communications processor means; and
      (ii) executing a transmit-to-DTE task to transfer valid Host data via said I/O Interface means to the DTE in accordance with the I/O protocol.

5. The DCE defined in claim 4 wherein, for communication over the low-speed channel:
   (a) the functions performed by the DTE DCE communications processor means comprise
      (i) executing a receive-from-DTE task to retrieve and buffer data from the DTE; and
      (ii) executing a LS-transmit task to assemble DTE data according to the low-speed protocol and to transmit the data via said TLI means over the low-speed communication channel; and
   (b) the functions performed by the Host DCE communication processor means comprise
      (i) executing a LS-receive task to buffer DTE data received over the low-speed channel via said TLI network means; and
      (ii) executing a transmit-to-Host task for transferring DTE data to the Host via said I/O Interface means in accordance with the I/O protocol.

6. The DCE defined in claim 5 wherein, for communications over the low-speed channel
   (a) the functions performed by said DTE DCE communications processor means through execution of the LS-transmit task further include inserting an error-checking-code; and
   (b) the functions performed by said Host DCE communications processor means through execution of the LS-receive task further include checking the DTE data received via said TLI means for errors, and for invalid data, requesting, via the high-speed channel, retransmission by said DTE DCE communications processor means.

7. The DCE defined in claim 6 wherein, for communications over the high-speed channel:
   (a) the functions performed by said Host DCE communications processor means in executing the receive-from-Host task further include compressing the Host data in accordance with a compression scheme; and
   (b) the functions performed by said DTE DCE communications processor means in executing the transmit-to-DTE task include decompressing the received Host data.

8. The DCE defined in claim 7 wherein, for communication over the high-speed channel data is transmitted in blocks according to a high-speed protocol, and
   (a) the functions performed by said DTE DCE communications processor means in executing the HS-receive task further include
      (i) checking each received Host data block for errors;
      (ii), after a selectable number of blocks, a block group, are received, transmitting back to said Host DCE, via the low-speed channel, an acknowledgement signal that designates the first block of the block group that is invalid, if any; and (b) the functions performed by said Host DTE communications processor means in executing the HS-transmit task include
  (i) responding to the receipt of an acknowledgement from said DTE DCE by retransmitting the designated valid block, or if all blocks of a group were invalid, by transmitting the next block; or
  (ii) if no acknowledgement is received during a time-out period after a block group has been transmitted, transmitting a selectable number of requests for acknowledgement before dropping the communications link.

9. The DCE defined in claim 8 wherein said communication processor means includes an HSCI, high speed channel interface, network means for interfacing to said TLI means to perform the error checking function including
  (a) for operation with said Host DCE communications processor means, generating and inserting error-checking-codes; and
  (b) for operation with said DTE DCE, checking such codes and providing a valid/invalid data indication.

10. The DCE defined in claim 9 wherein said HSCI means provides:
  (a) for operation with said Host DCE, character-request interrupts to said communications processor means such that character bytes are transferred to said HSCI means for transmission over the high speed channel in accordance with the high-speed protocol, with an end-of-block code being supplied by said HSCI means when either
    (i) a selectable maximum byte-length is reached for a block, or
    (ii) communications processor does not respond within a selectable time-out period;
  (b) for operation with said DTE DCE, byte segregation for the characters of a received Host data block and corresponding character-ready interrupts to said communications processor.

11. The DCE defined in claim 10 wherein the I/O protocol provides symmetrical I/O transmit/receive speeds to the Host and DTE.

12. The DCE defined in claim 11 wherein said TLI network includes Host/DTE switch means for, at least, selectively coupling said high-speed communications means (i) to transmit over the high-speed channel for Host operation, and (ii) to receive off the high-speed channel for DTE operation.

13. The DCE defined in claim 1 wherein the I/O protocol provides symmetrical I/O transmit/receive speeds to the Host and DTE.

14. The DCE defined in claim 13 wherein said TLI network includes Host/DTE switch means for, at least, selectively coupling said high-speed communications means (i) to transmit over the high-speed channel for Host operation, and (ii) to receive off the high-speed channel for DTE operation.

* * * * *